(12) United States Patent
Oosthoek

(10) Patent No.: US 11,405,669 B2
(45) Date of Patent: Aug. 2, 2022

(54) SYSTEM FOR SYNCHRONIZED VIDEO PLAYBACK ON A NUMBER OF PLAYBACK DEVICES

(71) Applicant: SES-Imagotag GmbH, Fernitz-Mellach (AT)

(72) Inventor: Jan Oosthoek, Landsmeer (NL)

(73) Assignee: SES-IMAGOTAG GMBH, Fernitz-Mellach (AT)

( * ) Notice: Subject to any disclaimer, the term of this patent is extended or adjusted under 35 U.S.C. 154(b) by 0 days.

(21) Appl. No.: 16/762,709

(22) PCT Filed: Nov. 10, 2017

(86) PCT No.: PCT/EP2017/078844
§ 371 (c)(1),
(2) Date: May 8, 2020

(87) PCT Pub. No.: WO2019/091565
PCT Pub. Date: May 16, 2019

(65) Prior Publication Data
US 2021/0176505 A1 Jun. 10, 2021

(51) Int. Cl.
*H04N 21/2387* (2011.01)
*G06F 3/14* (2006.01)
*H04N 21/231* (2011.01)
*H04N 21/43* (2011.01)
*H04N 21/4402* (2011.01)

(52) U.S. Cl.
CPC ....... *H04N 21/2387* (2013.01); *G06F 3/1423* (2013.01); *H04N 21/231* (2013.01); *H04N 21/4302* (2013.01); *H04N 21/4402* (2013.01)

(58) Field of Classification Search
CPC ............ H04N 21/2387; H04N 21/231; H04N 21/242; H04N 21/4302; H04N 21/4305; H04N 21/4307; H04N 21/4788; H04N 21/8547; G06F 3/1423
See application file for complete search history.

(56) References Cited

U.S. PATENT DOCUMENTS

| 6,046,709 A  * | 4/2000 | Shelton .................... G09G 5/12 345/1.1 |
| 9,086,838 B2 * | 7/2015 | Panvelwala ........... G06F 3/1446 |
| 10,643,609 B1 * | 5/2020 | Pogue .................... G10L 15/18 |
| 10,713,908 B2 * | 7/2020 | Yokoyama ............... G06F 3/16 |
| 2002/0129290 A1 * | 9/2002 | Couillard ................ H04L 63/12 713/400 |

(Continued)

FOREIGN PATENT DOCUMENTS

EP     2461582 A1 *   6/2012   ............. G06F 3/147

*Primary Examiner* — Ricky Chin
(74) *Attorney, Agent, or Firm* — Dennemeyer & Associates, LLC

(57) ABSTRACT

A video playback system, comprising a number of playback devices to playback a video on their screens, each playback device comprises a memory to store video data representing said video, and a communication stage to communicate data with each other, wherein the devices are designed to transmit video playback progress-data via the communication stage to the other device and to determine based on the received progress-data whether it is in a synchronous or asynchronous playback progress with the other devices.

15 Claims, 4 Drawing Sheets

(56) References Cited

U.S. PATENT DOCUMENTS

| | | | |
|---|---|---|---|
| 2007/0057865 A1* | 3/2007 | Song | G06F 3/1431 345/1.1 |
| 2011/0157106 A1* | 6/2011 | Kim | G09G 5/12 345/204 |
| 2011/0242412 A1* | 10/2011 | Lee | G06F 3/1446 348/E5.009 |
| 2012/0075334 A1* | 3/2012 | Pourbigharaz | G06F 3/1438 345/619 |
| 2012/0215903 A1* | 8/2012 | Fleischman | G06Q 50/01 709/224 |
| 2012/0221628 A1* | 8/2012 | Fujigaki | H04L 67/148 709/203 |
| 2013/0038509 A1* | 2/2013 | Jiang | G09G 5/12 345/1.3 |
| 2013/0173742 A1* | 7/2013 | Thomas | H04N 21/242 709/217 |
| 2014/0029701 A1* | 1/2014 | Newham | H04J 3/0652 704/E21.001 |
| 2014/0029910 A1* | 1/2014 | Maruyama | H04N 21/43074 386/220 |
| 2014/0323036 A1* | 10/2014 | Daley | H04W 56/0015 455/3.06 |
| 2015/0067521 A1* | 3/2015 | Heo | G06F 3/1446 715/733 |
| 2015/0091917 A1* | 4/2015 | Li | G06F 3/1446 345/1.3 |
| 2016/0034244 A1* | 2/2016 | Howard | G06V 10/10 345/156 |
| 2016/0266704 A1* | 9/2016 | Park | G06F 3/1446 |
| 2016/0357493 A1* | 12/2016 | Zerwas | G09G 5/12 |
| 2017/0098431 A1* | 4/2017 | Oh | G09G 5/12 |
| 2017/0153864 A1* | 6/2017 | Zhou | A63F 13/358 |
| 2017/0214954 A1* | 7/2017 | Trollope | H04N 21/4788 |
| 2019/0043450 A1* | 2/2019 | Kwa | G06F 3/1431 |
| 2020/0051527 A1* | 2/2020 | Ngo | H04N 5/57 |
| 2021/0064331 A1* | 3/2021 | Goto | H04N 21/8113 |
| 2021/0173606 A1* | 6/2021 | Oosthoek | G06F 3/1446 |
| 2021/0176505 A1* | 6/2021 | Oosthoek | H04N 21/4402 |

* cited by examiner

SYSTEM FOR SYNCHRONIZED VIDEO PLAYBACK ON A NUMBER OF PLAYBACK DEVICES

CROSS-REFERENCE TO RELATED APPLICATIONS

This is a 35 U.S.C. 371 National Stage Patent Application of International Application No. PCT/EP2017/078844, filed Nov. 10, 2017 which is hereby incorporated by reference in its entirety.

TECHNICAL FIELD

The invention relates to a system for synchronized video playback on a number of playback devices.

BACKGROUND

A known video play back system comprises a central server for distributing a video stream to a number of devices. Synchronized playback of the video content by all playback devices is achieved by controlling the playback at the playback devices with a highly precise and system wide timing signal delivered by the server or by a system wide synchronized clock signal available within the playback devices.

The known system shows the drawback that it requires high bandwidth for the just in time distribution of the video content to the video playback devices. Further to this, fast and therefore expensive hardware of the playback devices is required to receive the streamed video, buffering it and to synchronously playback the video content on the individual playback devices in accordance to the timing determined either by the timing signal delivered by the server or the system wide synchronized clock signal.

The object of the invention is to provide a system that avoids the problems discussed above and that is capable of playing back synchronized video on a number of devices comprised of relatively inexpensive hardware.

SUMMARY OF THE INVENTION

This object is achieved by a system according to claim 1. Therefore, the subject matter of the invention is a video playback system, comprising a number of playback devices to playback a video on their screens, each playback device comprises a memory to store video data representing said video, and a communication stage to communicate data with each other, wherein the devices are designed to transmit (broadcast) video playback progress-data via the communication stage to the other device and to determine based on the received progress-data whether it is in a synchronous or asynchronous playback progress with the other devices.

The object is also achieved according to claim 15. Therefore, the subject matter of the invention is a use of the system according to the invention as video playback enabled electronic shelf label system for the playback of synchronized video content for a number of shelf rails, wherein each of said shelf rails is realized by a screen or carries a screen.

The measures according to the invention provide the advantage that each individual display device can independently detect an asynchronous playback progress within the group of display devices. This is achieved by a simple and fast comparison of the playback progress of another device or of other devices with its own playback progress. In fact, the group of display device establishes an autonomous, distributed detection system for detecting an asynchronous playback progress within this group. No super-efficient and expensive hardware is required to achieve this, which is of particular importance for the targeted use case of the video playback system for synchronized shelf rail video playback, which is explained in detail later. In this use case (application) a very large number of shelf rails must typically display synchronized video sequences. Hence the number of display devices controlling the screens is also high and therefore must be realized as inexpensive as possible in order to be accepted by the target group of customers.

Further particularly advantageous designs and extensions of the invention arise from the dependent claims and the following description.

For the system, it is of particular advantage that it comprises a video distribution server for distribution of the video data to the devices, in particular the entire video data of a video upfront to playback start at the devices. In particular the server may use the same communication stage for downloading the video data to the devices, which is thereafter used for the transmission of playback progress-data. Advantageously, after download of the video data is completed, the communication channel/medium used for downloading the video data to the device is fully available for the communication of the devices with each other. Hence, no high payload causing communication protocols or negotiation processes between the devices are necessary to transmit the playback progress-data.

According to a fundamental aspect of the invention, it is of particular advantage that the devices are designed to determine independently from a video distribution server, which distributed the video data to the devices, that they are in a synchronous or asynchronous playback progress.

For the sake of clarity, it is mentioned that the communication between the server and the devices as well as the communication between the devices may be realized either by means of wires, e.g. two wire or bus systems, or radio signals.

The devices are designed to playback compressed video data that are structured in frames labeled by frame numbers.

The progress-data may be any indicator that allows to represent the currently played back part of the video or to measure the already elapsed playback time since playback start or to indicate the remaining playback time until the end of the video or the like, e.g. measured in milliseconds or seconds or percentage.

However, according to a preferred embodiment of the invention the devices are designed to utilize a frame number that labels the frame that is currently played back as the progress-data to be transmitted. This provides the advantage that a representation of the playback progress is used, which is inherently available on all devices without any further computation.

Further to this, each device is designed to compare a frame number received with a frame number of the frame currently played back at the device and to determine an asynchronous playback progress if the difference in the frame numbers compared with each other exceeds a predetermined threshold value. Dependent on the actual playback parameters, the threshold may be set to 100, which is programmed upfront to processing into all devices. In this example, a device that currently plays back frame 2500 will determine an asynchronous playback progress if the frame number received from another device is 2602.

In order to keep the information of playback progress permanently updated within the group of devices, each device is designed to repeatedly transmit the progress-data.

The exact moment in time the individual device transmits its individual progress-data may be arbitrary, e.g. defined by random within a certain time window or the like. The transmission may also take place every time a new frame of a compressed video is processed. According to a preferred embodiment the transmission is performed in a periodic manner. Experiments performed during the design and development phase of the system revealed that a periodic transmission every second showed good results in terms of keeping the playback synchronous over the devices. The exact parameter for a particular realization is of course dependent on parameters (speed, accuracy, oscillator drift . . . ) of the hardware used.

The device that detects an asynchronous playback process may influence its individual playback progress so to establish a synchronous playback progress. However, this would not guarantee that its particular measures solve the playback drift of other devices. The result may even be a larger diverging of other devices' playback progress from a synchronous playback progress. Therefore, it is of advantage to use the device that detects the asynchronous playback progress to influence the playback progress all other devices—and also its own playback progress if necessary. According to this finding each device is designed to broadcast adjustment data for adjusting the playback progress of the devices over its communication stage if it detects an asynchronous playback progress.

In a preferred embodiment, advantageously each device is designed to embed the adjustment data in a synchronization command that is broadcasted if it detects an asynchronous playback progress. This allows an unambiguous detection of the adjustment data on the side of the devices receiving the transmission.

In order to properly and rapidly react on the detected asynchronous playback progress, each device is designed to receive the adjustment data (embedded in said synchronization command that is decoded/detected when received) and to adjust its playback progress according to the adjustment data, in particular to continue its playback of compressed video data that are structured in frames labeled by frame numbers with the frame number received in the broadcast of the adjustment data. In this preferred embodiment, immediately after detection of the asynchronous playback progress the detecting device (the device that detected the asynchronous playback progress) defines the frame number at which playback shall continue and instructs all the other devices to switch to said defined frame number. All other devices follow this instruction with immediate effect upon receipt of the synchronization command. The continuation of the playback at the defined frame number may be delayed for a short period (so short that it is practically invisible by the viewer) so that all devices can timely follow the instruction to switch their playback progress to said defined frame number. This provides a highly efficient system behavior that requires very little communication bandwidth and processing power in order to secure a synchronous playback progress over the entire group of devices.

The communication between the devices may be performed according to various protocol implementations. In order to keep the communication highly efficient in an environment with up to a few thousand devices it is of particular advantage that the communication stage is designed to use UDP multicast data packets for the communication. Here UDP stand for "User Datagram Protocol" and multicast means a transmission of a message from one device to a number of devices.

According to an embodiment of the invention each display device may comprise its screen or a number of screens to be controlled by it. Regarding its resolution, a screen may be a standard definition, high definition or even ultra-height video panel. According to a further embodiment of the invention each device may be connected to its external screen or a number of screens to be controlled by it. In addition, also mixed configurations may be envisaged. In this configuration video data processing is performed in the device that in turn submit display data or display signals to the screen, where the data or signals are converted into visible images.

In a preferred embodiment said screen is designed to realize a shelf rail or a part of it, or to cover a front of a shelf rail or a part of it to which it is attachable. Such a screen typically shows large width measured along the shelf rail length in comparison to little height measured perpendicular thereto.

In such a configuration, the system realizes a video playback enabled electronic shelf label system.

Here it is of particular advantage that the display devices are designed to display product information or product price related information by means of virtual electronic shelf labels displayed within a section of a screen's display area overlapping with a video content or substituting a video content of said section.

Further to this, the devices may be designed to playback a plurality of videos simultaneously. For example, a background video may be played back on a number of shelf rails while at the same time an advertisement video may be played back on the same shelf rails but in a spatially limited video window within the screen areas of the individual screens. In this video window, it overlaps or replaces the background video. Also in this scenario, the measures of the invention can be applied to each video (the background video and the advertisement video) in order to keep its playback synchronized over all involved devices. The additional—e.g. advertisement related—video may be played back independently from the aforementioned virtual electronic shelf labels or as an element of the content of said virtual self labels.

Given the fact that in a large retail store a huge number of shelf rails may exist, it is of utmost economic benefit to utilize inexpensive hardware for the installation of such video playback enabled electronic shelf labels throughout the entire store. Here the measures according to the invention enable a stable and synchronous video playback on all shelf rails by means of a very simple and inexpensive display device hardware without any server interaction to guarantee synchronism in the playback progress. Advantageously, also the payload e.g. in the radio channel used to keep the display devices in synchronism with each other is so low that hardly any or even no other communication processes between other devices in the ecosystem of the retail store are disturbed.

The features of the invention may be realized by means of pure hardware or of programmable hardware on which a software is executed, e.g. microprocessors, microcontrollers or application specific circuits with memory devices to store the software are to be considered.

The devices and their screens are supplied with electric power by means of a centralized power supply or distributed power supplies. Electric power is supplied by means of cables. Also battery powered systems are possible.

These and other aspects of the invention are obtained from the figures discussed below.

BRIEF DESCRIPTION OF THE FIGURES

The invention is explained again hereafter with reference to the attached figures and on the basis of exemplary embodiments, which nevertheless do not limit the scope of the invention. In the different figures the same components are labelled with identical reference numbers. They show in schematic fashion in.

DESCRIPTION OF THE EXEMPLARY EMBODIMENTS

Figure 1:
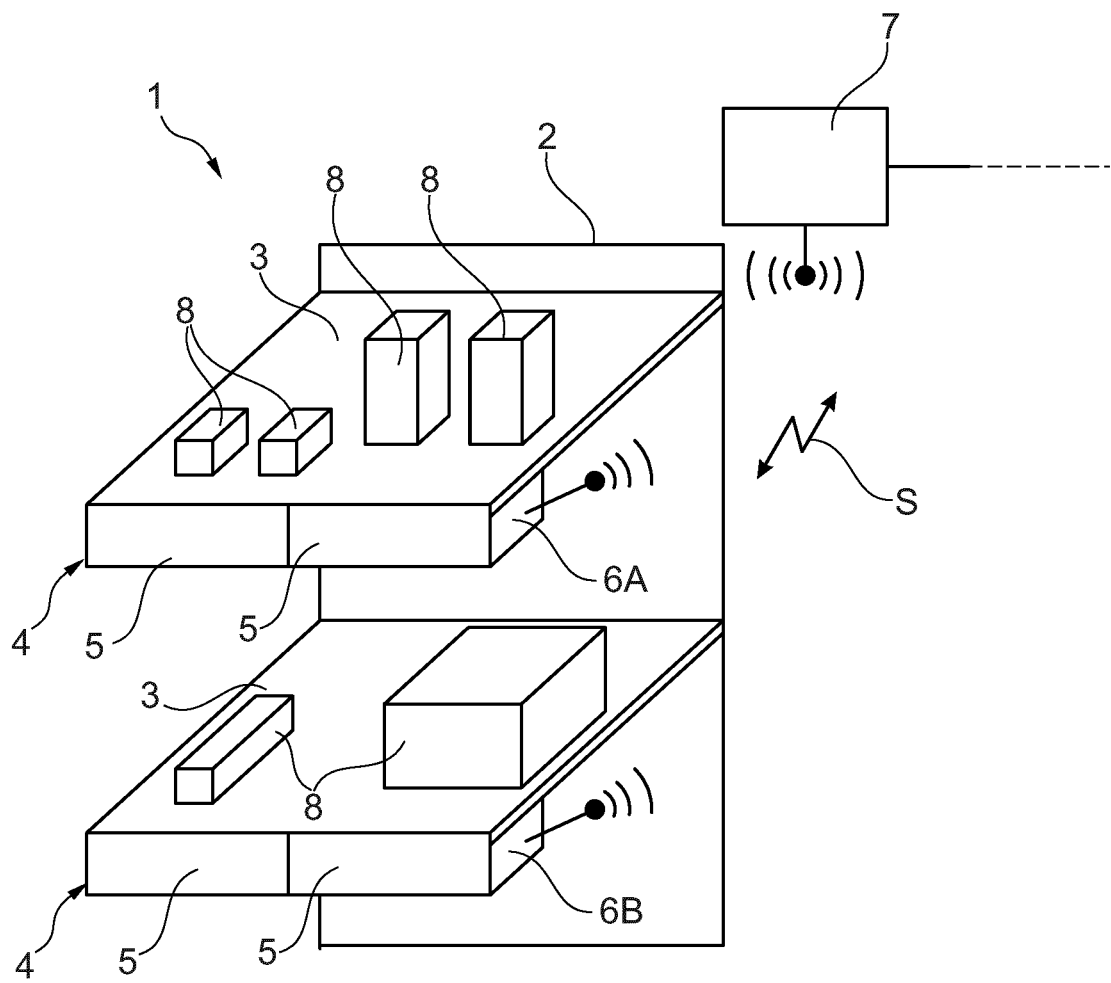
FIG. 1 a system according to the invention installed in a retail store.

Shown on FIG. 1 as a video playback system 1 according to the invention. The system 1 is installed in a retail shop of which only a shelf 2 is shown. The shelf 2 has two shelf floors 3 on which goods 8 are placed. At its front, each shelf floors 3 comprises a shelf rail 4 (not shown in detail) to which two video screens 5 are attached along its entire length. Further to this two identical playback devices 6A and 6B are shown. The first device 6A is connected to the screens 5 on the upper floor 3 and the second device 6B is connected to the screens 5 on the lower floor 3.

The video content (film) to be displayed on the screens 5 is supplied by a server 7 via a radio signal to both devices 6A and 6B. The video content is delivered in form of compressed video data that are structured in frames labeled by frame numbers.

Figure 2:
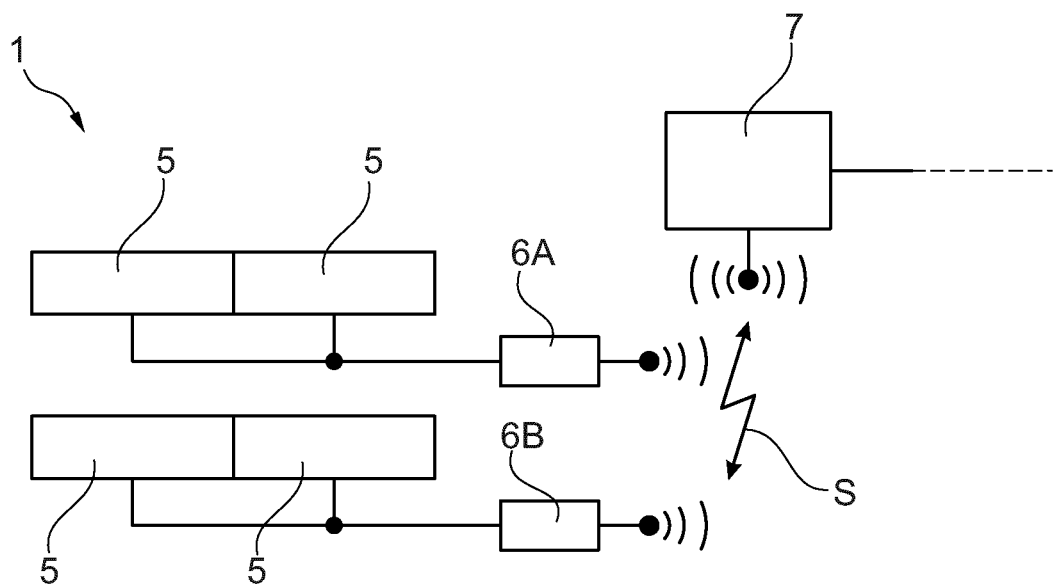
FIG. 2 a schematic view of components of the system.

FIG. 2 shows the connection of the components in form of a block diagram. Here a wire-based connection of the devices 6A and 6B with their displays 5 is shown.

In the following the operation of the system 1 is explained by a method of synchronizing the playback of the video over both devices 6A and 6B. As a result, the video playback on both shelf rails is synchronized with each other. The method is now explained by the aid of a flow diagram shown in FIG. 3.

The method starts in block 9. In block 10 the server sends out the video to the devices 6A, 6B. In block 11 the devices 6a, 6B start playing back the video.

In block 12 each device 6A and 6B attends the lapse of one second of its own clock. After one second has lapsed, the respective device 6A, 6B transmits the playback progress-data, which represent the frame number of the correctly used frame in the respective device 6A, 6B. The transmission of the playback progress-data of the device 6A is received at the device 6B and vice versa.

In block 13 the devices 6A, 6B compare the received frame number with the frame number currently in use in its own playback process.

Irrespective of the question which of the two devices 6A, 8B detects a difference of more than 2 frames at first, the device 6A or 6B that detected the difference sends out a synchronization commend immediately, which happens in block 14. The argument of the synchronization command is the higher fame number of the two frame numbers compared with each other.

Figure 4:
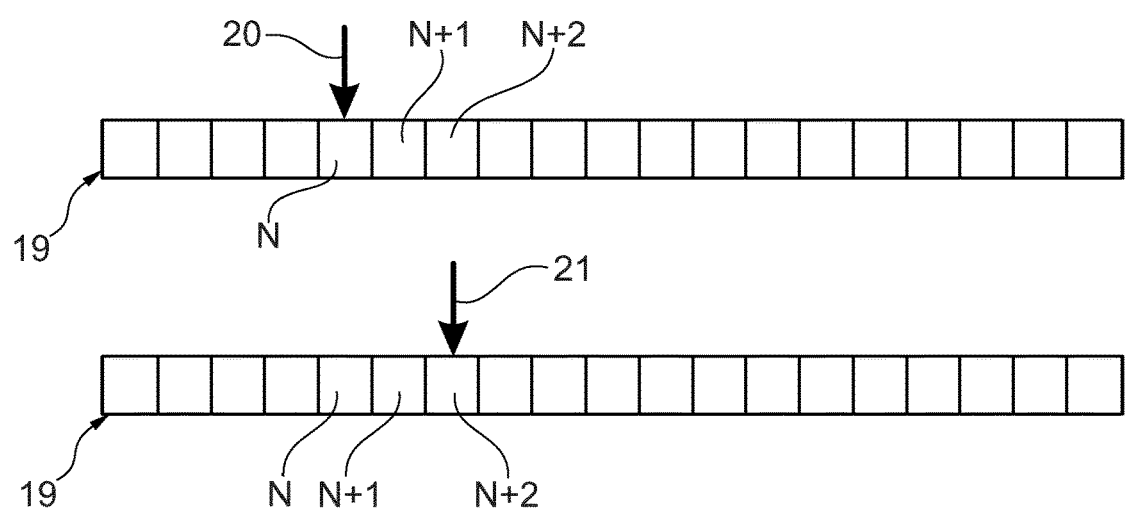
FIGS. 4-5 two video data streams structured in frames.
Figure 5:
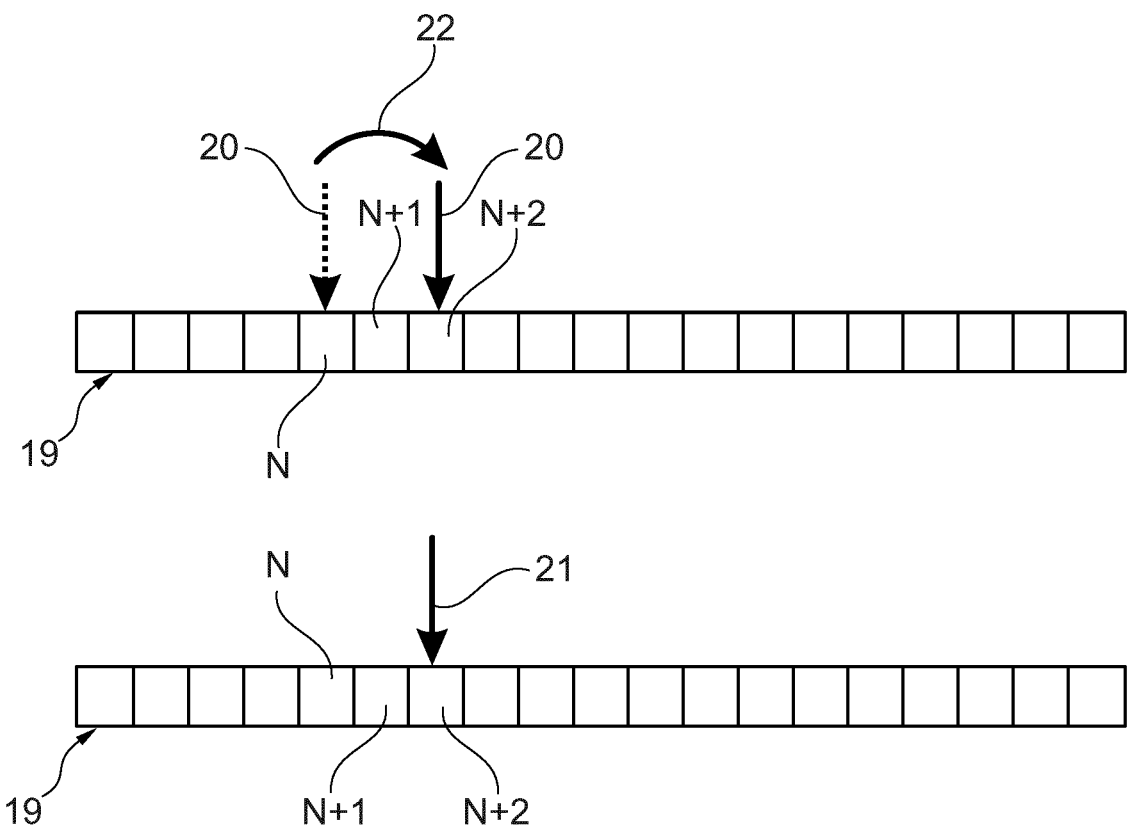

In the following this method is explained by the aid of FIG. 4 and FIG. 5 that visualize frame structured video data 19. The upper video data 19 are processed by the first device 6A while the lower video data 19 are processed by the second device 6B. Both video data 19 and 20 are identical and were submitted as initially mentioned by the server. FIG. 4 also shows an asynchronous playback progress because a first processing pointer 20 indicates the frame number N that is currently processed by the first device 6A while at the same time the second device 6B processes frame number N+2 which is shown with a second processing pointer 21.

Here frame number N+2, which is the higher number of the two frames compared with each other, is the argument of the synchronization command.

In the present example, it is assumed that the first device 6A has detected the asynchronous playback progress at first and sends out the synchronization command.

Figure 3:
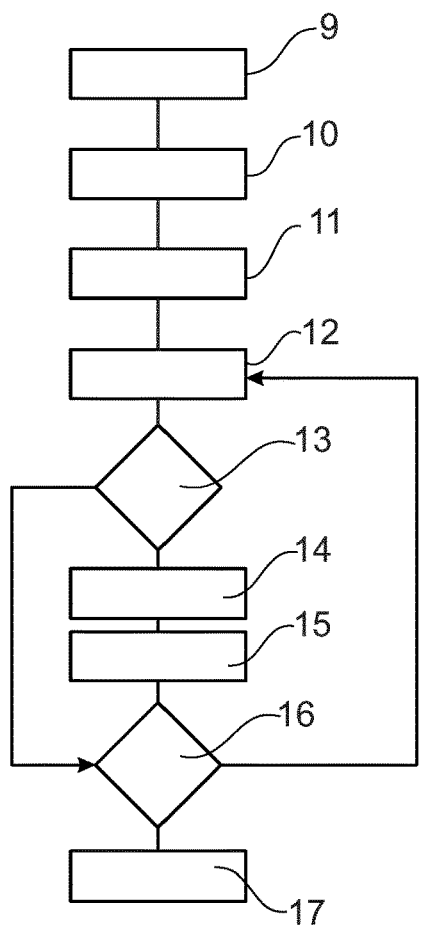
FIG. 3 a method according to the invention.

Going now back to FIG. 3, in block 15 both devices 6A and 6B are re-synchronized by continuing their playback at frame number N+2. Also FIG. 5 shows the re-synchronization of the playback progress. In particular it shows that the first processing pointer 20 is moved forward to frame number N+2 (indicated by arrow 22) while the second processing pointer 21 remained at frame number N+2.

Now at frame number N+2 both devices continue to playback the video, which in FIG. 3 is associated with block 15.

In block 16 a check is performed if the video has reached its end. If the end is not reached the method branches to block 12 in order to attend the lapse of said one second interval bevor the check for synchronism is repeated.

If in block 16 the end of the video is detected the method ends in block 17. It is to mention that the video can also be repeated by loop play.

If in block 13 no difference greater than 2 is detected, the method branches to block 16.

Although the method of the invention was so far explained by only two display devices 6A and 6B, it is to mention that in a system with a relatively high number of display devices (e.g. a few thousands) a significant number of devices may operate for longer periods in synchronism with each other before a single asynchronous event is detected by one of the devices. This detected event of asynchronous playback progress then causes all the other devices to adjust to the frame number dictated by the device that detected the asynchronous playback progress.

Figure 6:
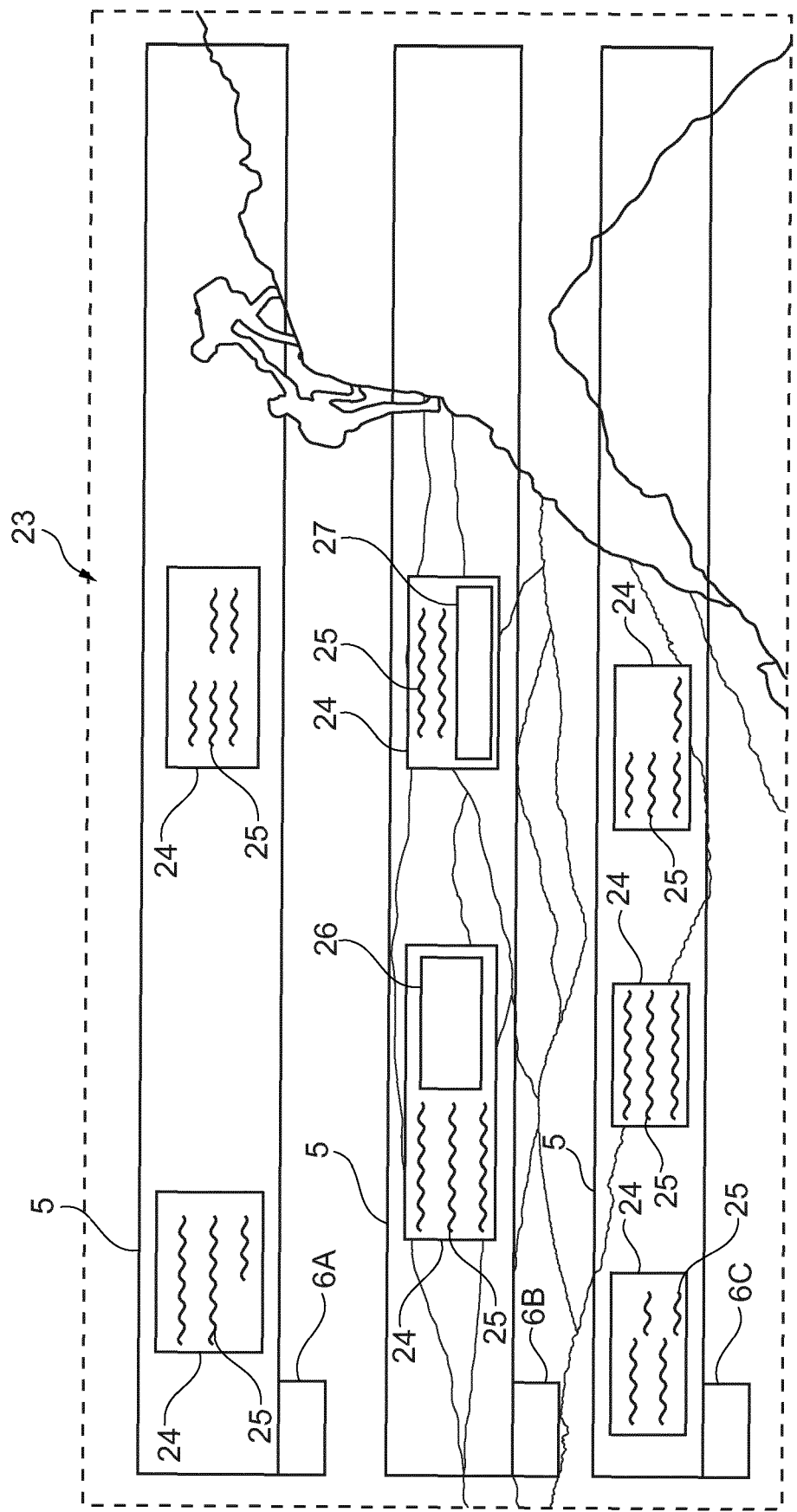
FIG. 6 a visualization of an application of the invention.

In the following the operation of the system 1 is now explained by the aid of FIG. 6. FIG. 6 shows a snapshot of a video 23 that was distributed to three display devices 6A, 6B, 6C by the server 7 before playback started on said devices 6A-6C. According to this embodiment each device 6A-6C drives a single screen 5.

Although the shelf 2 on which the screens 5 are installed is not shown in FIG. 6, it is mentioned for the sake of clarity that each of the devices 6A-6C controls the playback of its individual screen 5. Each of the screens 5 covers one of the shelf rails 4. Each shelf rail 4 forms the front of a shelf floor 3 on which in the present case mountaineering products (not shown) are presented. The three shelf floors 3 are arranged one above the other as part of the shelf 2.

The devices 6A, 6B, 6C were programmed by the server 7 to playback only a part of the entire content of the video 23 with individual zoom settings. Here the zoom for the upper screen 5 mounted on the upper shelf rail 4 is set to an upper part of the video 23 that shows in the snapshot two climbers reaching the top of a mountain. The zoom for the screen 5 on the middle shelf rail 4 was set to the center part of the video 23 showing in the snapshot the leg of one of the climbers just before moving upwards. The zoom of the screen 5 on the bottom shelf rail 4 shows on its left side the view into the distant landscape while on its right part rocks in the foreground are visible in the snapshot.

The zoom on the individual sections of the video is realized e.g. by the aid of a well-known video-feature called "viewbox". The video content outside the three individual zoom settings is simply not shown on the screens 5. However, in the spatial arrangement of the shelf 2 this area between the screens 5 is used to present products related to mountaineering.

This allows to spatial distribute the synchronized video experience over the three screens 5, in fact over the three shelf rails 4. Due to the spatial distribution of the mountaineer video 23 over the three shelf rails 4, the mountaineering products are now presented in the appropriate context.

In addition to this, FIG. 6 also shows electronic shelf label content 24 (of virtual electronic shelf labels) displayed at the appropriate position where sais mountaineering products are located on the shelf floors 3. This content is embedded into to the video 23 and also supplied by the server 7 to the individual devices 6A-6C. The content 24 may comprise static (textual) information related to product and/or price information indicated by wavy lines 25. The content 24 may also comprise individual video sequences 25 and 26 which are assigned to particular electronic shelf label 24 (see for example the middle screen 5).

Further to this, also the entire electronic shelf label content 24 or even individual areas of the screens 5 may be used to display an advertisement video that was initially distributed to the individual playback devices 6A-6C and then played back distributed over the three shelf rail screens 5. Similar to the (background) video 23 the entire advertisement experience assembles from the distributed display of individual advertisement elements of the advertisement video played back in synchronous mode on the different screens 5. In this mode in fact two different videos—on the one hand the (background) video 23 and on the other hand said advertisement video—are played back simultaneously by the display devices 6A-6C. Also in this simultaneous playback mode, the devices 6A-6C make use of the measures according to the invention to keep playback on the different display devices 6A-6C for the two individual videos (the background video 23 and the advertisement video) synchronized.

This concept may also be applied to a higher number of videos.

The measures according to the invention may also be applied in a configuration where the video 23 (and optionally together with other advertisement videos as mentioned above) is e.g. played back in synchronized mode on display devices 6A, 6B, 6C, . . . , distributed over two or more shelfs 2, e.g. located side by side or stacked over each other.

Hence, for all the various video experiences that are achievable by distributed video playback over a number of shelfs rails 4 the measures according to the invention to keep video playback synchronized can be advantageously applied.

In summary, the method and the system of the invention provide a robust and reliable, instantaneous re-synchronization of the playback progress over the entire group of playback devices. This feature can be realized with relatively cheap hardware and do not require any high sophisticated communication protocols to be executed.

Finally, let it be noted once again that the figures described in detail above only involve exemplary embodiments, which the expert can modify in a wide variety of ways without departing from the area of the invention. For the sake of completeness, let it also be stated that use of the indeterminate article "a" or "an" does not mean that the respective features cannot be present multiple times.

The invention claimed is:

1. A video playback system (1), comprising a number of playback devices (6A, 6B) to playback a video on their screens (5), each playback device (6A, 6B) comprises a memory to store video data (9) representing said video, and a communication stage to communicate data with each other, wherein the devices (6A, 6B) are designed:
   to transmit video playback progress-data via the communication stage to the other device (6B, 6A); and,
   to determine based on the received progress data whether it is in a synchronous or asynchronous playback progress with the other devices (6B, 6A);
   wherein the display devices (6A, 6B) are designed to display product information or product price related information by means of virtual electronic shelf labels displayed within a section of a screen's (5) display area overlapping with a video content or substituting a video content of said section.

2. The system (I) according to claim 1, comprising a video distribution server (7) for distribution of the video data (9) to the devices (6A, 6B), in particular the entire video data (9) of a video upfront to playback start at the devices (6A, 6B).

3. The system (1) according to claim 1, wherein the devices (6A, 6B) are designed to determine independently from a video distribution server (7) which distributed the video data (9) to the devices (6A, 6B) that they are in a synchronous or asynchronous playback progress.

4. The system (1) according to claim 1, wherein the devices (6A, 6B) are designed:
   to playback compressed video data (9) that are structured in frames labeled by frame numbers, and
   to utilize a frame number that labels the frame that is currently played back as the progress-data to be transmitted.

5. The system (I) according to claim 4, wherein each device (6A, 6B) is designed to compare a frame number received with a frame number of the frame currently played back at the device (6A, 6B) and to determine an asynchronous playback progress if the difference in the frame numbers compared with each other exceeds a pre-determined threshold value.

6. The system (1) according to claim 1, wherein each device (6A, 6B) is designed to repeatedly transmit the progress-data, preferred in a periodic manner, more preferred every second.

7. The system (1) according to claim 1, wherein each device is designed to broadcast adjustment data for adjusting the playback progress of the devices (6A, 6B) over its communication stage if it detects an asynchronous playback progress.

8. The system (1) according to claim 7, wherein each device (6A, 6B) is designed to embed the adjustment data in a synchronization command.

9. The system (1) according to claim 8, wherein each device (6A, 6B) is designed to receive the adjustment data and to adjust its playback progress according to the adjustment data, in particular to continue its playback of compressed video data that are structured in frames labeled by frame numbers with the frame number received in the broadcast of the adjustment data.

10. The system (1) according to claim 7, wherein each device (6A, 6B) is designed:

to receive the adjustment data; and to adjust its playback progress according to the adjustment data, in particular to continue its playback of compressed video data that are structured in frames labeled by frame numbers with the frame number received in the broadcast of the adjustment data.

11. The system (1) according to claim 1, wherein the communication stage is designed to use UDP multicast data packets for the communication.

12. The system (1) according to claim 1, wherein each display device (6A, 6B):
- comprises its screen (5) or a number of screens (5), or
- is connected to its external screen (5) or a number of screens (5) to be controlled by it.

13. The system (1) according to claim 1, wherein said screen (5) is designed
- to realize a shelf rail (4) or part of it, or
- to cover a front of a shelf rail (4) or a part of it to which it is attachable.

14. The system (1) according to claim 1, wherein the system realizes a video playback enabled electronic shelf label system.

15. A use of the system (1) according to claim 1 as video playback enabled electronic shelf label system for the playback of synchronized video content for a number of shelf rails (4), wherein each of said shelfs rails (4) is realized by a screen (5) or carries a screen (5).

\* \* \* \* \*

(12) INTER PARTES REVIEW CERTIFICATE (4011th)

United States Patent
Oosthoek

(10) Number: US 11,405,669 K1
(45) Certificate Issued: Jul. 9, 2025

(54) SYSTEM FOR SYNCHRONIZED VIDEO PLAYBACK ON A NUMBER OF PLAYBACK DEVICES

(71) Applicant: Jan Oosthoek

(72) Inventor: Jan Oosthoek

(73) Assignee: VUSIONGROUP GMBH

Trial Number:

IPR2024-00188 filed Nov. 13, 2023

Inter Partes Review Certificate for:

Patent No.: 11,405,669
Issued: Aug. 2, 2022
Appl. No.: 16/762,709
Filed: May 8, 2020

The results of IPR2024-00188 are reflected in this inter partes review certificate under 35 U.S.C. 318(b).

INTER PARTES REVIEW CERTIFICATE
U.S. Patent 11,405,669 K1
Trial No. IPR2024-00188
Certificate Issued Jul. 9, 2025

AS A RESULT OF THE INTER PARTES REVIEW PROCEEDING, IT HAS BEEN DETERMINED THAT:

Claim 11 is found patentable.

Claims 1-10 and 12-15 are cancelled.

\* \* \* \* \*